US012572446B2

(12) United States Patent
Knierim

(10) Patent No.: US 12,572,446 B2
(45) Date of Patent: Mar. 10, 2026

(54) AUTOMATIC ASSIGNMENT OF CHANGED PERMISSIONS FOR DIAGNOSTIC PURPOSES FOR WORK CONTAINER INSTANCES THAT HAVE ALREADY BEEN STARTED

(71) Applicant: Siemens Aktiengesellschaft, Munich (DE)

(72) Inventor: Christian Knierim, Munich (DE)

(73) Assignee: Siemens Aktiengesellschaft, Munich (DE)

( * ) Notice: Subject to any disclaimer, the term of this patent is extended or adjusted under 35 U.S.C. 154(b) by 271 days.

(21) Appl. No.: 18/368,266

(22) Filed: Sep. 14, 2023

(65) Prior Publication Data
US 2024/0095148 A1 Mar. 21, 2024

(30) Foreign Application Priority Data
Sep. 21, 2022 (EP) .................................... 22196855

(51) Int. Cl.
*G06F 11/3604* (2025.01)
*G06F 9/455* (2018.01)
(Continued)

(52) U.S. Cl.
CPC ...... *G06F 11/3612* (2013.01); *G06F 9/45558* (2013.01); *G06F 11/1438* (2013.01); *G06F 11/302* (2013.01)

(58) Field of Classification Search
CPC ............... G06F 11/1438; G06F 11/302; G06F 11/3612; G06F 2009/45587; G06F 2009/45591; G06F 9/45558
See application file for complete search history.

(56) References Cited

U.S. PATENT DOCUMENTS

2016/0357618 A1* 12/2016 Degioanni .......... G06F 11/3082
2022/0247725 A1* 8/2022 Panchamia ......... H04L 12/4633
(Continued)

FOREIGN PATENT DOCUMENTS

CN 110825490 A 2/2020
CN 113010342 A 6/2021
CN 113722050 A 11/2021

OTHER PUBLICATIONS

Container Design Patterns, Github, May 2022, 4 pages, [retrieved on Aug. 6, 2025], Retrieved from the Internet: <URL:http://dl.acm.org/>.*

*Primary Examiner* — Geoffrey R St Leger
(74) *Attorney, Agent, or Firm* — Schmeiser, Olsen & Watts, LLP

(57) ABSTRACT
A method for automatically assigning changed permissions for diagnostic purposes for work container instances is provided including: in a reconfiguration unit of a runtime environment of the device or an orchestration device, receiving configuration information for starting a container instance, identifying diagnostic configuration information for providing at least one diagnostic container instance of a diagnostic application that carries out diagnostic activities, retrieving existing work container instances from a classification database, determining a reconfiguration requirement of the retrieved work container instances, changing initial work configuration information to provide diagnostic data according to the diagnostic configuration information for each work container instance for which a reconfiguration requirement has been determined, restarting the changed work container instances according to the changed work configuration information, and starting the at least one diagnostic container instance of a diagnostic application according to the diagnostic configuration information.

15 Claims, 4 Drawing Sheets

41

| Inst-ID | Inst-MOD | Konf-LINK | App-TYP | Diag-REF |
|---------|----------|-----------|---------|----------|
| ID-1 | Standard | Deploym1-yaml | Standard app | -- |
| ID-2 | Diagnostic | Deploym2-yaml | Standard app | Diag-App1 (K1), Diag-App2 (K1,K2) |
| ID-3 | Standard | Deploym3-yaml | Diagnostic app | -- |
| ID-4 | Diagnostic | Deploym4-yaml | Diagnostic app | Diag-App1 (K3) |

(51) Int. Cl.
    *G06F 11/14*       (2006.01)
    *G06F 11/30*       (2006.01)

(56)              References Cited

U.S. PATENT DOCUMENTS

2023/0065431 A1*   3/2023   Kumar ................... G06F 9/445
2023/0125847 A1*   4/2023   Sato ................... G06F 9/45558
                                      718/1
2023/0134277 A1*   5/2023   K ........................ G06F 9/45558
                                      717/125

* cited by examiner

| Inst-ID | Inst-MOD | Konf-LINK | App-TYP | Diag-REF |
|---------|-----------|--------------|----------------|-----------------------------------|
| ID-1 | Standard | Deploym1-yaml | Standard app | – |
| ID-2 | Diagnostic | Deploym2-yaml | Standard app | Diag-App1 (K1), Diag-App2 (K1,K2) |
| ID-3 | Standard | Deploym3-yaml | Diagnostic app | – |
| ID-4 | Diagnostic | Deploym4-yaml | Diagnostic app | Diag-App1 (K3) |

AUTOMATIC ASSIGNMENT OF CHANGED PERMISSIONS FOR DIAGNOSTIC PURPOSES FOR WORK CONTAINER INSTANCES THAT HAVE ALREADY BEEN STARTED

CROSS-REFERENCE TO RELATED APPLICATIONS

This application claims priority to EP Application No. 22196855.5, having a filing date of Sep. 21, 2022, the entire contents of which are hereby incorporated by reference.

FIELD OF TECHNOLOGY

The following relates to a method, a system and a computer program product for automatically assigning changed permissions for diagnostic purposes for work container instances that have already been started and provide a predetermined container-implemented application on a device.

BACKGROUND

Container virtualization is an operating system-level virtualization method. In this case, computer programs are provided with a complete runtime environment virtually within a closed software container. The runtime environment can be used by a multiplicity of containers and accesses an operating system core of a host computer. Software containers, referred to as containers for short below, are thus, in comparison with virtual machines that have their own operating system and are assigned hardware resources of the underlying system using a hypervisor and have their own operating system core, a resource-saving type of virtualization and encapsulate a software application operated in a container from the underlying host computer. Software applications are now implemented in many areas through the use of container technology, for example in industrial automation and process control, but also in transport systems or building automation.

In order to be able to start a container on the host computer, a container image is required, which contains not only the application software but also the binaries and libraries required for the application software. A container, or more precisely a container instance, is created from the container image with the aid of deployment information on the host computer and is executed in the runtime environment of the host computer.

An orchestrated runtime environment includes an orchestrator and at least one host computer, usually a multiplicity of host computers, also referred to as nodes, that are assigned to the orchestrator. The orchestrator starts, manages and terminates container instances on the assigned host computers. Typical orchestrated runtime environments are Kubernetes-based container environments that manage, for example, cloud-based container-as-a-service environments or cloud-operated virtual instances as nodes of an orchestrated runtime environment.

In containerized runtime environments, it is common for certain higher-privileged container instances to monitor other container instances or restrict them based on a predefined set of rules. In order for a container instance intended for monitoring to be able to perform these restrictions or monitoring, such instances are equipped with higher process privileges in many cases. This ensures that they can access the other instances or the underlying system. In addition to using orchestrated runtime environments in the IT environment, these are also used in the industrial Internet of Things (IoT) environment. Diagnostic applications that consist of a plurality of these higher-privileged container instances for monitoring tasks are known in the industrial environment.

However, in order to be able to perform monitoring activities, it is not sufficient in some cases that only instances of the diagnostic application are given higher privileges, but also that a runtime configuration of the workload instances to be monitored must be adapted to provide the diagnostic activity.

SUMMARY

An aspect relates to a method which dynamically and individually changes the configuration of workload instances and thus makes it possible to perform diagnostic activities.

According to an aspect, embodiments of the invention relate to a method for automatically assigning changed permissions for diagnostic purposes for work container instances that have already been started and provide at least one container-implemented application on a device, comprising the following steps carried out in a runtime environment of the device or in an orchestration device that controls the provision of the application by containers:

- receiving configuration information for starting a container instance,
- identifying diagnostic configuration information for providing at least one diagnostic container instance of a diagnostic application that carries out diagnostic activities with respect to the at least one work container instance of the application,
- retrieving existing work container instances executing the application from a classification database,
- determining a reconfiguration requirement of the retrieved work container instances depending on the diagnostic configuration information in a reconfiguration unit,
- changing initial work configuration information to provide diagnostic data according to the diagnostic configuration information for each work container instance for which a reconfiguration requirement has been determined,
- restarting the changed work container instances according to the changed work configuration information, and
- starting the at least one diagnostic container instance of a diagnostic application according to the diagnostic configuration information.

This makes it possible to reconfigure work container instances that have already been started even during their runtime and thus make them accessible to the diagnosis by the restarted diagnostic application. By virtue of the classification database, all work container instances to be reconfigured can be determined and retrieved centrally in an efficient manner with regard to process capacity without having to query and thus load the runtime environment or the orchestration device itself. It is therefore possible to check which container instances need to be reconfigured and which do not. The reconfiguration unit bundles the functions for determining the configuration changes. Implementing the reconfiguration unit in the runtime environment or the orchestration device makes it possible to implement the configuration changes without forwarding them to other units in the runtime environment or orchestration device.

In an embodiment, the changed work configuration information and the diagnostic configuration information is stored in the classification database. Optionally, the diagnostic application that generates the changes is also recorded for the respective instance in the classification database.

This means that the classification database is updated automatically and promptly. If a further diagnostic application is intended to be started, the configuration changes due to the first diagnostic application can also be taken into account in the work configuration information in order to determine the reconfiguration requirement. Optionally, the classification database records which diagnostic application generates which changes in a container instance so that conflicts with reconfiguration requirements of other diagnostic applications can be detected directly.

In an embodiment, the work configuration information for the at least one work container, for which the reconfiguration requirement has been determined, comprises diagnosis-specific marks with changed parameters, and the changed parameters are then activated in the work configuration information when the specific diagnostic configuration information is identified. Alternatively or additionally, the diagnostic configuration information comprises work container-specific marks with changed parameters that are then activated in the work configuration information for the specific work container when the diagnostic configuration information is identified.

The parameters arranged in the diagnosis-specific or work container-specific marks, if they are activated in the configuration information, lead to the properties for providing diagnostic data. Thus, the changes can be predefined and activated efficiently without separate configuration instructions in the work configuration information. Furthermore, the diagnostic application-specific properties and work container-specific adaptations can be introduced efficiently thereby.

In an embodiment, the changing of the work configuration information to provide diagnostic data comprises at least one of the following parameters: a process privilege, a network configuration, a memory configuration or a Linux namespace in which the determined work container is executed.

Thus, certain diagnosis-specific functions can be newly introduced into the work container instance. For example, additional application parameters can be read out from the work container instance and transferred to the diagnostic container instance through a newly implemented permission to access a previously inaccessible memory area and an extended network configuration.

In an embodiment, the diagnostic configuration information is identified based on a predetermined property contained in the diagnostic configuration information. Alternatively, the diagnostic configuration information is identified based on a predetermined property which is transferred, outside the diagnostic configuration information, to the runtime environment of the device. The property is uniquely assigned to the diagnostic configuration information.

Thus, various properties in the diagnostic configuration information can be used flexibly to identify the diagnostic configuration and can be implicitly transported with the diagnostic configuration information. This reduces the transmission effort and reduces the susceptibility to errors due to external assignment. When the properties are transferred outside the diagnostic configuration information, e.g., by meta information associated with the diagnostic configuration information, properties that were not originally intended to detect the diagnostic configuration information can be assigned retrospectively.

In an embodiment, the integrity of the work configuration information and/or a work container instance referenced in the work configuration information is secured with a digital signature method.

This makes it possible to prevent the work configuration information from being changed in such a way that it is classified by a user as a diagnostic application, for example by inserting the detection property as a diagnostic application.

In an embodiment, those properties which are needed to identify the diagnostic configuration information or a diagnostic container instance referenced in the diagnostic configuration information are specified in a classification guideline and are provided in the reconfiguration unit.

This means that the properties can be provided in a collected manner and can be exchanged flexibly.

In an embodiment, the classification database contains, for each work container instance that has already been started, a current runtime mode, which indicates whether the work container instance is present in a standard mode according to the initial work configuration information or in a diagnostic mode according to the changed work configuration information, and contains a reference to the currently started work configuration information. Optionally, the classification database contains, for a work container instance that has already been started, the information about which diagnostic application causes the change for a container instance and which changes (e.g., by recording the flag) have been applied.

In an embodiment, the reconfiguration unit contains a prioritization attribute for the work configuration information, which attribute indicates whether a further work container instance to be restarted is preferably started according to the changed or the initial work configuration information.

This means that, when further work container instances are restarted, the current version, i.e., with or without diagnostic functions, can be started according to the running diagnostic applications. A subsequent reconfiguration associated with time and computing capacity is thus avoided.

In an embodiment, a conflict detection is carried out on the changed work configuration information when determining the reconfiguration requirement in the reconfiguration unit when second or further diagnostic configuration information is identified.

Thus, after detecting diagnostic configuration information, opposed, mutually blocking parameters or configuration details can be identified in the work configuration information and conflict resolution measures can be taken. Conflicts can occur in particular if the work configuration information has already been changed for a first diagnostic application that has already been started.

In an embodiment, when a further work container instance of a further application for starting in the runtime environment is received, a reconfiguration requirement for the further work container instance is determined on the basis of the diagnostic configuration information and a conflict detection is carried out on the further work configuration information to be started.

This means that further work container instances of a further application to be restarted are already adapted to an existing diagnostic application before being started. This avoids adaptation or conflicts after the further application has been started, which could cause delays in executing the further application.

In an embodiment, a reconfiguration requirement is determined in the changed work configuration information upon receiving a deletion request for the diagnostic application. For example, this is carried out by checking in the classification database whether the diagnostic application to be deleted has been entered for the respective instance and whether any further diagnostic applications have requested the same change due to their application.

This means that the diagnosis-specific work configuration information can be reversed again or the entry of the changed work provision information in the classification database can be deleted. This means that the classification database is updated automatically.

According to a further aspect, embodiments of the invention relate to a system for automatically assigning changed permissions for diagnostic purposes for work container instances that have already been started and provide a container-implemented application on a device, comprising a runtime environment on the device or an orchestration device that controls the provision of the application by containers and a classification database which are designed to carry out the steps of the method described above.

According to a further aspect, embodiments of the invention relate to a computer program product (non-transitory computer readable storage medium having instructions, which when executed by a processor, perform actions) comprising a non-volatile computer-readable medium which can be loaded directly into a memory of a digital computer, comprising program code parts which, when the program code parts are executed by the digital computer, cause the digital computer to carry out the steps of the method.

Unless stated otherwise in the following description, the terms "start", "receive", "identify", "determine", "change" and the like preferably relate to actions and/or processes and/or processing steps that change and/or generate data and/or convert the data into other data, wherein the data may be represented or be present in particular as physical variables, for example as electrical pulses.

The system and components optionally contained therein, such as the device, the orchestration device, the classification database and the like, may comprise one or more processors. A processor may in particular be a main processor (central processing unit, CPU), a microprocessor or a microcontroller, for example an application-specific integrated circuit or a digital signal processor, possibly in combination with a memory unit for storing program commands, etc.

A computer program product, such as a computer program means, can be provided or supplied, for example, as a storage medium, such as a memory card, a USB stick, a CD-ROM, a DVD or in the form of a downloadable file from a server in a network.

BRIEF DESCRIPTION

Some of the embodiments will be described in detail, with reference to the following figures, wherein like designations denote like members, wherein.

DETAILED DESCRIPTION

Figures 1, 2:
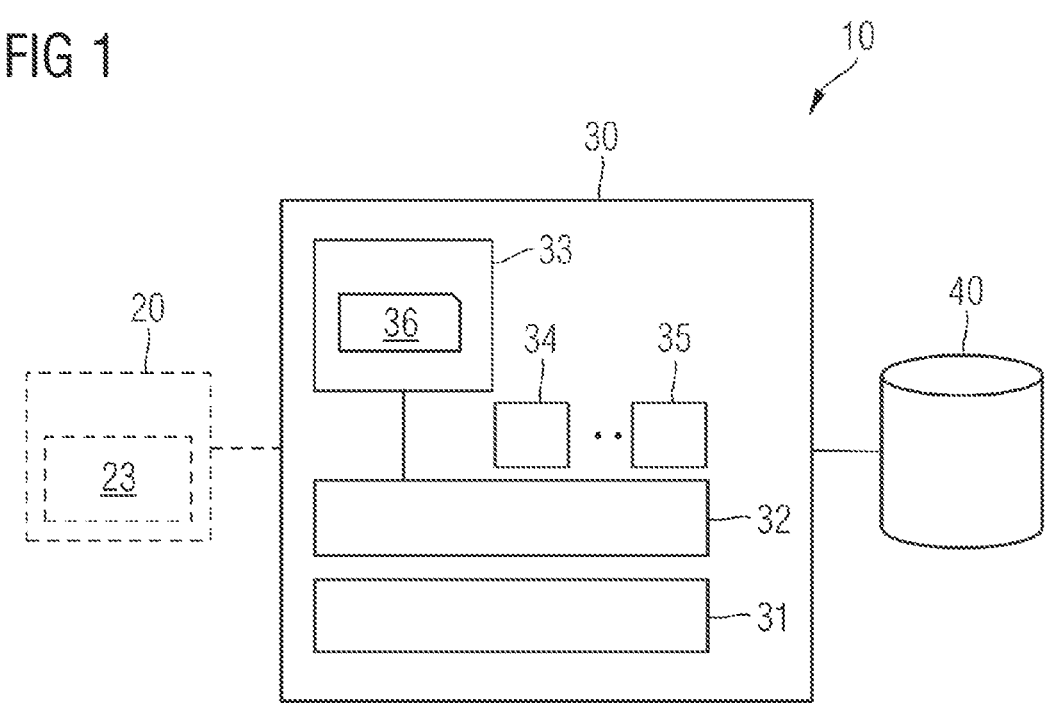
FIG. 1 shows a schematic illustration of an exemplary embodiment of a system according to embodiments of the invention.
FIG. 2 shows a schematic illustration of an exemplary embodiment of an entry in a classification database according to embodiments of the invention.

FIG. 1 shows an exemplary embodiment of a system 10 according to embodiments of the invention. An application is executed on a device 30, such as an Internet of Things (IoT) device, using a work container or a plurality of different work containers that provide different parts of the application. A work container instance 34 is configured and started using work configuration information from a work container image in a container runtime environment 32, referred to as the runtime environment for short below. The runtime environment 32 accesses an operating system core 31 of a device 30. In an orchestrated environment, an orchestration device 20 starts and manages container instances of an application that are executed on one or more devices. Since the orchestration device 20 is used only in an orchestrated environment and not in an environment managed by the runtime environment 32, it is shown using dashed lines in FIG. 1.

In order to be able to perform these diagnostic activities, it is not sufficient in some cases that only diagnostic container instances 35 are equipped with monitoring properties. It is additionally also necessary to adapt the runtime configuration of the work container instances 34 to provide the diagnostic activity. Configuring individual work container instances 34 makes it possible, for example, to increase a log level of the application operated within the instance, as a result of which application logs are recorded in more detail, for example for a plurality of different events, or data are redirected via a diagnostic interface of the diagnostic application so that appropriate evaluations can be carried out. Another example is the integration of the modules required for the diagnosis within the work container instance, which modules require changed process privileges.

In order to be able to perform these diagnostic activities, it is not sufficient in some cases that only diagnostic container instances 34 are equipped with monitoring properties. It is additionally also necessary to adapt the runtime configuration of the work container instances 35 to provide the diagnostic activity. Configuring individual work container instances 34 makes it possible, for example, to increase a log level of the application operated within the instance, as a result of which application logs are recorded in more detail, for example for a plurality of different events, or data are redirected via a diagnostic interface of the diagnostic application so that appropriate evaluations can be carried out. Another example is the integration of the modules required for the diagnosis within the work container instance, which modules require changed process privileges.

The basic idea of embodiments of the invention is that the orchestration device 20 or the container runtime environment 32, when starting an application categorized as a diagnostic application, individually reconfigures individual work container instances 34 operated on the device 30 by adapting the associated work configuration information individually in order to carry out the diagnostic activities.

The runtime environment 32 and, in the orchestrated case, the orchestration device 20 are assumed to be trusted. In the orchestrated environment, a reconfiguration unit 23 cooperates with the orchestration device, and, in a non-orchestrated environment, a reconfiguration device 33 cooperates with the runtime environment 32. The reconfiguration unit 23, 33 can be integrated in the orchestration device 20 or in the runtime environment 33, for example can be designed as a plug-in, or can be in the form of an independent program which communicates with the orchestration device 20 or the container runtime environment 32. The reconfiguration unit 23, 33 is embodied only once and thus cooperates either with the orchestration device 20 or with the runtime environment 32.

The reconfiguration unit 23, 33 is designed to identify diagnostic configuration information of the diagnostic application. Furthermore, the reconfiguration unit 23, 33 is configured to retrieve the work container instances 34, which execute the application, from a classification database 40, to identify a reconfiguration requirement, i.e., diagnosis-specific adaptations, for the work container instances 34 and to return them to the runtime environment 32 or the orchestration device 20 in order to make the changes. The orchestration device 20 or the runtime environment 32 is designed to create changed work configuration information and to restart changed work containers according to the changed work configuration information. The orchestration device 20 or the runtime environment 32 then starts the at least one diagnostic container instance.

Figure 3:
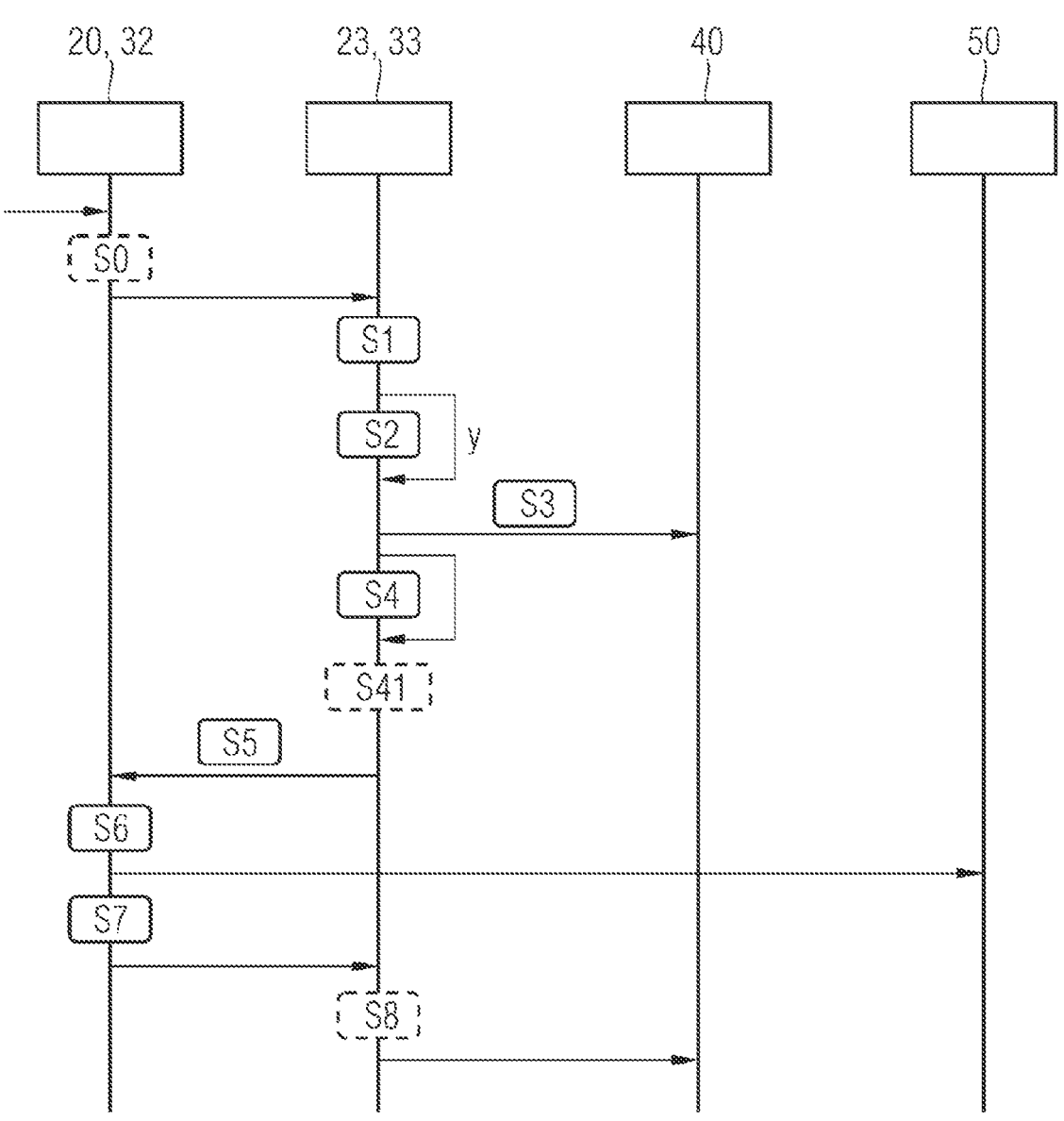
FIG. 3 shows an exemplary embodiment of the method according to embodiments of the invention as a flowchart.

The sequence of the proposed method between the orchestration device 20 or the runtime environment 32, the reconfiguration unit 23, 33, the classification database 40 and a work container instance 50 is explained in more detail with reference to FIG. 3.

After configuration information for starting a container instance has been transferred, see S0, to the orchestration device 20 or the runtime environment 32, this information is forwarded and is received in the reconfiguration unit 23, 33, see S1. The reconfiguration unit 23, 33 checks whether the configuration information is diagnostic configuration information, i.e., a diagnostic container instance is intended to be started, or whether a container instance referenced in the configuration information is part of a diagnostic application, see S2.

The diagnostic configuration information is identified based on a predetermined property that is contained in the diagnostic configuration information itself or is transferred, outside the diagnostic configuration information, to the runtime environment 32 of the device 30 or the orchestration device 20.

Such a property is, for example, authorized access to certain resources of the device 30, for example authorized access to a socket interface of the runtime environment 33. For example, a property is also a certain process privilege or certain diagnosis-specific marks, certain work container-specific marks, certain provision signatures, or certain image signatures, an installation within a certain client, such as a Kubernetes namespace, contained in the diagnostic configuration information.

Such marks are, for example, labels that contain additional, for example predefined, diagnosis-specific or work container-specific information. If such a predefined mark is detected in the configuration information, the configuration information is classified as diagnostic configuration information.

A namespace is an isolation method in container virtualization, for example for processes in a Linux operating system core. Processes outside an assigned namespace are not visible. These namespaces can be used for inter-process communication (ipc), for mounting file systems (mount), for process identifiers (pid) or for networks and users. Simply put, if there is a connection to a specific namespace of another container, it is possible to look inside that container and perform operations.

The provision signature is an identifier for certain diagnostic configuration information that is created with a signature function, for example a hash function, for example using a cryptographic key. An image signature is created in the same way by encoding a container image. If the signatures are provided outside the configuration information or outside a container image, the orchestration device 20 or the runtime environment 32 can transfer them to the reconfiguration unit 23, 33 in addition to the configuration information.

Any combination of the above-mentioned properties is also possible. The properties required to classify the configuration information and/or individual container instances as diagnostic configuration information or work configuration information are specified in a classification guideline and are provided in the reconfiguration unit 23, 33.

In order to prevent any applications from being able to be classified by a user as diagnostic applications, it is proposed in one variant that the integrity of both the work configuration information and/or a work container instance referenced in the work configuration information or the referenced containers to be secured with the aid of known signature methods.

If the configuration information has been identified as diagnostic configuration information, see the label y at step S2, all entries for existing work container instances are retrieved from the classification database 40 S3. In particular, for the work container instances, the links to the configuration information Inst-LINK are transmitted to the reconfiguration unit 23, 33. If diagnostic container instances are already being executed in the runtime environment 32 of device 30, they are treated as work container instances and are also retrieved from the classification database 40.

FIG. 2 illustrates a classification database 41 with exemplary entries for running work container instances. The classification database 41 comprises an entry for each work and diagnostic container instance that has already been started, an instance identifier Inst-ID, a current runtime mode Inst-MOD, which indicates whether the work or diagnostic container instance is present in a standard mode according to the initial work or diagnostic configuration information or in a diagnostic mode according to the changed work or diagnostic configuration information, as well as a reference (a link) to the currently started work or diagnostic configuration information Konf-LINK.

Changed diagnostic configuration information is generated when a reconfiguration requirement for the diagnostic container instance or its diagnostic configuration information is determined and carried out on the basis of a further diagnostic application that has been started. Optionally, the entry comprises a classification type App-TYP that indicates whether it is a diagnostic container instance or a work container instance. Optionally, the entry comprises a diagnostic application reference Diag-REF which specifies the name of the diagnostic application and the applied flags for reconfiguring a container instance for each diagnostic application that has implemented a change in the container instance.

Subsequently, a reconfiguration requirement of the retrieved work container instances is determined in the reconfiguration unit 23, 33 depending on the diagnostic configuration information, see step S4.

The configuration changes required for the diagnostic application can be specified according to two variants. The two variants can be combined with each other.

According to the first variant, the diagnostic app itself specifies the changes for the work container instances operated in the runtime environment 33. The diagnostic configuration information specifies change operations for predefined work container-specific marks, signatures, or other referenced configuration settings.

According to the second variant, additional diagnostic provision information, for example work container-specific marks with changed parameters, is stored within the work configuration information and "overwrites" the standard settings and thus generates the changed work configuration information from the initial work configuration information. References to other diagnostic apps can also be referenced with the aid of signatures, labels, also referred to as marks, image or deployment names, tags, or the like, so that the work container instance can be configured differently for a plurality of diagnostic applications if necessary.

The reconfiguration requirement is determined by virtue of the fact that the reconfiguration unit 23, 33 checks the determined work configuration information with regard to the work container-specific marks, signatures or other referenced configuration settings predefined in the diagnostic configuration information, and, if these are contained in the work configuration information, corresponding changed work configuration information is created, see S5. In the same way, the reconfiguration unit 23, 33 checks the initial work configuration information for additional diagnostic provision information and activates this, i.e., creates corresponding changed work configuration information, see S5.

Changes to the work configuration information to provide diagnostic data comprise at least one of the following parameters: a process privilege, a network configuration, a memory configuration or a (Unix) namespace in which the determined work container is executed. A change in the memory configuration can be, for example, to remove or reconfigure a volume, i.e., memory areas that are in the form of RAM, volatile memory and as well as persistent memory, for example.

If the work configuration information for the at least one work container, for which the reconfiguration requirement has been determined, comprises diagnosis-specific marks with changed parameters, the changed parameters are then activated in the work configuration information when the specific diagnostic configuration information has been identified. If the diagnostic configuration information comprises work container-specific marks with changed parameters, the changed parameters are then activated in the work configuration information for the specific work container when the diagnostic configuration information is identified.

The at least one item of changed work configuration information is transmitted from the reconfiguration unit 23, 33 to the runtime environment 32 or the orchestration device 20, see step S6. The work container instances are then generated by the runtime environment 32 or the orchestration device 20 and a restart of the work container instance is requested in accordance with the changed work configuration information for the runtime environment 32. The runtime environment 32 then restarts the changed work container instances, see S6. In addition, the at least one diagnostic container instance of a diagnostic application is now started according to the diagnostic configuration information, see S7.

In the initial state, the classification database 40 is empty. The changed work container instances are generated directly by the runtime environment 32 or by the instance reconfiguration unit 33 within a database or the local file system. The changed work configuration information and the diagnostic configuration information is now transmitted to the classification database 40 and stored there, see S8.

If no work container instances to be changed were identified in step S4, the orchestration device or the runtime environment 32 is informed that the work container instances linked in the diagnostic configuration information can be generated according to the initial configuration information.

When checking the configuration information, see S2, it is optionally possible to check whether further work container instances are present in diagnostic mode, i.e., with changed work configuration information in the classification database.

In a reconfiguration guideline contained in the reconfiguration unit 23, 33, it can be specified which type of work configuration guideline is intended to be implemented as a priority. For this purpose, the reconfiguration guideline contains a prioritization attribute for the work configuration information, which attribute indicates whether a further work container instance to be restarted is preferably started according to the changed or the initial work configuration information.

Since individual parameters in the configuration information can create conflicts between each other when using a plurality of diagnostic applications at different locations, the reconfiguration unit 23, 33 also performs conflict detection for individual parameters when determining the reconfiguration requirement, see S41. Within the reconfiguration guideline, it is also possible to describe how the conflict should be resolved. Conflict resolution can be, for example, that only the changes specified in the diagnostic application are carried out, or that a union with priority of the parameters specified in the diagnostic application is formed, or that the highest specified privilege is used. If the conflict cannot be resolved, an error message is returned, with the result that the runtime environment 32 or the orchestration device 20 does not start the diagnostic application.

If a conflict cannot be resolved, e.g., because two diagnostic applications require conflicting changes, the diagnostic applications can be prioritized based on their signature. This makes it possible to delete an existing low-priority diagnostic application on the system. Optionally, the low-priority diagnostic application is not deleted until the user has confirmed it.

If no conflict is detected within the changed work configuration information, the changed work configuration information including the container instances referenced in it is returned by the instance reconfiguration unit 23, 33 to the orchestration device 20 or the runtime environment 32 which stops the current work container instance and then restarts the work container instance with the changed parameters, see S7. The instance identifiers Inst-ID and the diagnostic application reference Diag-REF are then updated in the classification database 40 for each started work container instance by the runtime environment 32, the orchestration device 20 or the reconfiguration unit 23, 33 and the instance mode Inst-MOD is set to the diagnostic mode.

If the application comprises a plurality of different work containers and thus different items of work configuration information, the reconfiguration unit 23, 33 first carries out conflict detection for all active work container instances. Since the status for the respective work container instances is also stored within the classification database 40, only the initial work configuration information must be persistent, i.e., stored in a non-volatile memory, so that it remains unchanged even after a program restart/device restart. If a diagnostic application exists, the changed work configuration information, i.e., for the diagnostic mode, must only be derived at runtime.

Figure 4:
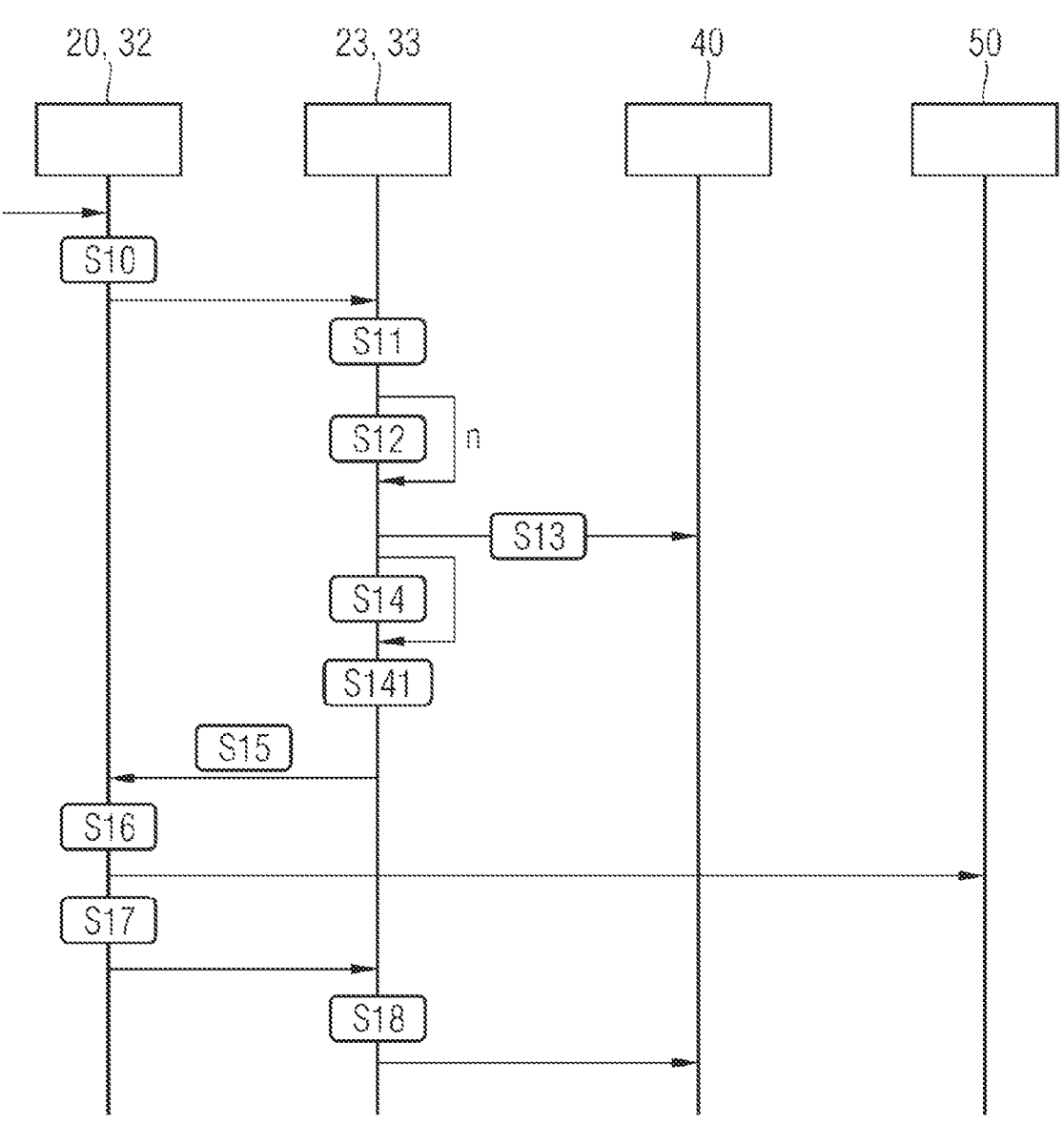
FIG. 4 shows an exemplary embodiment of the method according to embodiments of the invention when starting a work container instance of an application with an existing diagnostic application as a flowchart.

FIG. 4 shows the method when starting a new work container of a new application when there is at least one diagnostic application. Like in FIG. 3, FIG. 4 illustrates the sequence in the system 10 with the orchestration device 20.

Configuration information for the new work container is transferred S10 to the runtime environment 32 or the orchestration device 20 and is forwarded to the reconfiguration unit 23, 33. After receiving S11 the new configuration information in the reconfiguration unit 23, the latter checks whether it is diagnostic configuration information, see S12. After identifying/classifying the configuration information as work configuration information n, the reconfiguration unit 23, 33 asks the classification database 40 whether further diagnostic container instances are available, see S13, and determines a reconfiguration requirement for the work container instances to be restarted, 14. A conflict detection S141 is performed for the configuration requirements. If there are no non-resolvable conflicts, changed new work configuration information is created and thus the work container instance to be newly installed is immediately put into the diagnostic mode and then transmitted to the runtime environment 32 or the orchestration device 20, see S15. This then immediately starts the work container instance in the diagnostic mode, see S16, and reports that the changed work configuration information has been applied to the reconfiguration unit 23, 33. This initiates a new entry of the new work container instance generated in the diagnostic mode in the classification database 40, see S18.

Figure 5:
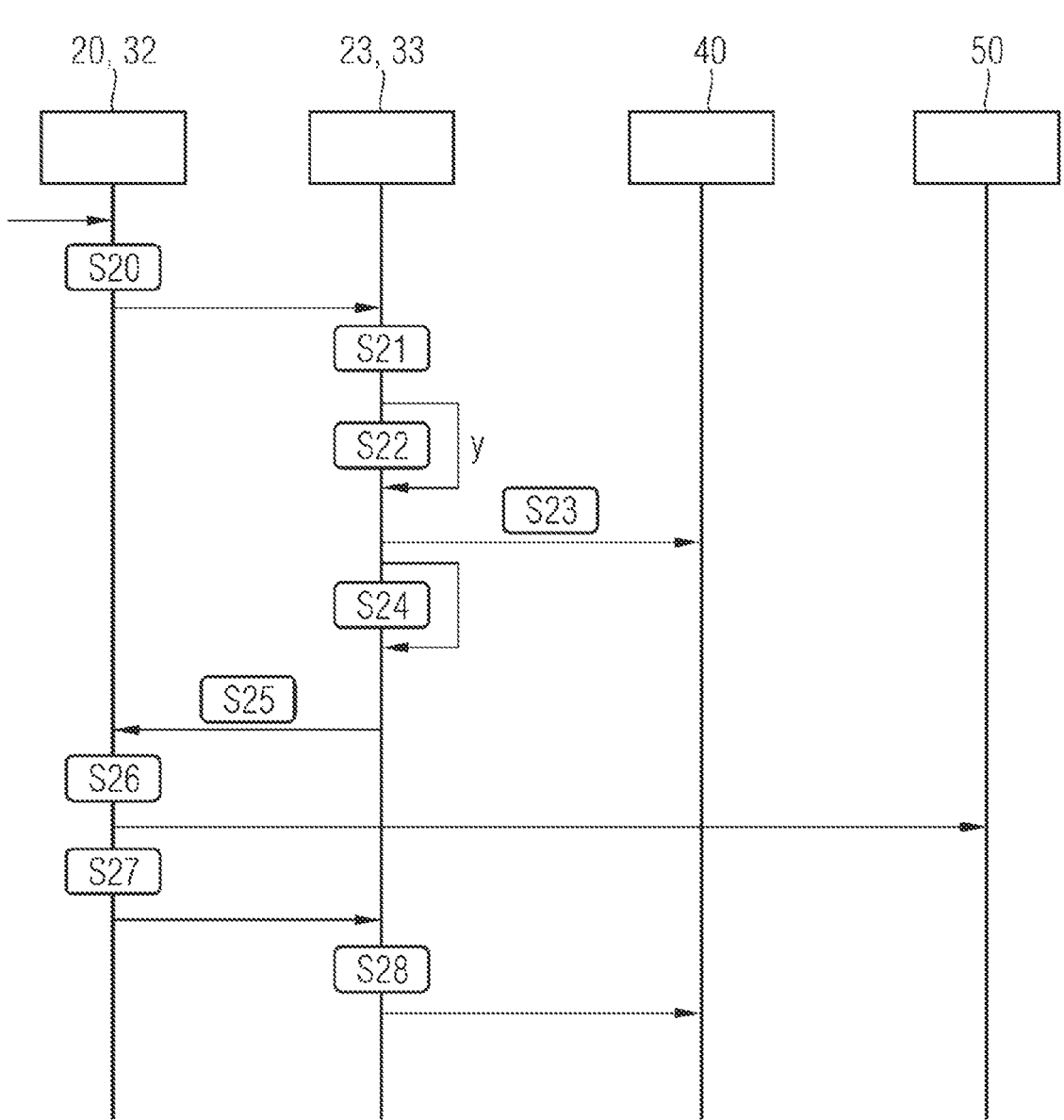
FIG. 5 shows an exemplary embodiment of the method according to embodiments of the invention when deleting an existing diagnostic application as a flowchart.

FIG. 5 shows the sequence when deleting a diagnostic application on the device 30 in the system 10.

If a diagnostic app is deleted, this information is forwarded from the runtime environment 32 or the orchestration device, see S20, and is received in the reconfiguration unit 23, 33 S21. There, an identification/classification S22 is performed and it is determined, as the result n, that the container instance to be deleted is a diagnostic instance. The reconfiguration unit 23, 33 determines existing changed work container instances S23 by querying the classification database 40, in particular the instance mode Inst-MOD and the diagnostic application reference Diag-REF. Diagnostic containers of other diagnostic applications that have been changed due to the diagnostic application to be deleted are maintained in the classification database 40 in the same way as changed work containers.

The reconfiguration unit 23, 33 determines the reconfiguration requirement of the instances in the diagnostic mode. In this case, instances can also remain in the diagnostic mode S24 due to existing other diagnostic applications. The reconfiguration unit 23, 33 changes S25 the configuration of the determined work container instances from the diagnostic mode to the standard mode, i.e., with initial work configuration information, and transmits this to the orchestration device 20 or the runtime environment 32. This now starts the work containers in the standard mode S26 according to the configuration information received.

The diagnostic app can be deleted directly by the orchestration device 20 or the runtime environment 32. After feedback S27 about a successful start of the work containers with initial work configuration information, the reconfiguration unit 23, 33 initiates an adaptation of the entries S28 in the classification database 40. The existing work container instances are returned to the standard mode unless they remain in the diagnostic mode due to other diagnostic applications, which can be detected by the diagnostic application reference by checking in the entry whether the configuration sections to be changed are retained. The entries stored for the diagnostic app are deleted.

If there is no difference between the diagnostic and standard mode in existing container instances, this can be determined by the reconfiguration unit 23, 33 when switching between the standard and diagnostic mode, with the result that only the changed container instances are restarted. The respective behavior is specified in the reconfiguration guideline. Unchanged instances do not receive a diagnostic status within the classification database 40 if they behave in this way.

In addition, the reconfiguration guideline can specify that certain container instances should be excluded from reconfiguration by a diagnostic app due to certain properties described above.

This allows diagnostic apps to reconfigure container instances of other containerized applications for diagnostic purposes. The operations required for diagnosis can be defined either by the containerized application itself or by the diagnostic application. Both methods can be combined in this case. It is possible to operate a plurality of diagnostic applications with different tasks, which perform different adaptations for different applications with regard to the diagnostic state. The entire application can either be restarted when it is moved to the diagnostic state or individual work container instances that are not affected by the reconfiguration can be excluded from this. In embodiments, the method can be used in both orchestrated and non-orchestrated environments.

Although the present invention has been disclosed in the form of embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

The invention claimed is:

1. A method for automatically assigning changed permissions for diagnostic purposes for work container instances that have already been started and provide at least one container-implemented application on a device, comprising:

in a reconfiguration unit of a runtime environment of the device or in a reconfiguration unit of an orchestration device, receiving configuration information for starting a container instance, identifying diagnostic configuration information for providing at least one diagnostic container instance of a diagnostic application that carries out diagnostic activities with respect to at least one work container instance of a predetermined application, retrieving existing work container instances from a classification database, determining a reconfiguration requirement of the retrieved existing work container instances depending on the diagnostic configuration information in a reconfiguration unit, changing initial work configuration information to provide diagnostic data according to the diagnostic configuration information for each work container instance for which a reconfiguration requirement has been determined,

in the runtime environment or in the orchestration device,
restarting changed work container instances according
to the changed initial work configuration informa-
tion, and
starting the at least one diagnostic container instance of
the diagnostic application according to the diagnos-
tic configuration information.

2. The method as claimed in claim 1, wherein the changed
initial work configuration information and the diagnostic
configuration information is stored in the classification data-
base.

3. The method as claimed in claim 1, wherein work
configuration information for each work container instance
for which the reconfiguration requirement has been deter-
mined comprises diagnosis-specific marks with changed
parameters, and the changed parameters are activated in the
work configuration information when the diagnostic con-
figuration information is identified, and/or wherein the diag-
nostic configuration information comprises work container-
specific marks with changed parameters, and the changed
parameters are then activated in work configuration infor-
mation for a specific work container when the diagnostic
configuration information is identified.

4. The method as claimed in claim 3, wherein the chang-
ing of the work configuration information to provide diag-
nostic data comprises at least one of the following param-
eters: a process privilege, a network configuration, a
memory configuration or a (Linux) namespace in which the
determined work container is executed.

5. The method as claimed in claim 1, wherein
the diagnostic configuration information is identified
based on a predetermined property contained in the
diagnostic configuration information, or
wherein the diagnostic configuration information is iden-
tified based on a predetermined property which is
assigned to the diagnostic application and is trans-
ferred, outside the diagnostic configuration informa-
tion, to the runtime environment of the device or the
orchestration device.

6. The method as claimed in claim 5, wherein the prede-
termined property is selected from the group of the follow-
ing properties: authorized access to certain resources of the
device, certain process privileges, certain diagnosis-specific
marks, certain work container-specific marks, certain pro-
vision signatures, certain image signatures, or an installation
within a certain client.

7. The method as claimed in claim 5, wherein properties
which are needed to identify the diagnostic configuration
information are specified in a classification guideline and are
provided in the reconfiguration unit of the runtime environ-
ment of the device or in the reconfiguration unit of the
orchestration device.

8. The method as claimed in claim 1, wherein an integrity
of the work configuration information and/or a work con-
tainer instance referenced in the work configuration infor-
mation is secured with a digital signature method.

9. The method as claimed in claim 1, wherein the clas-
sification database contains, for each work container
instance that has already been started, a current runtime
mode, which indicates whether the work container instance
is present in a standard mode according to the initial work
configuration information or in a diagnostic mode according
to the changed initial work configuration information, and
contains a reference to currently started work configuration
information.

10. The method as claimed in claim 1, wherein the
reconfiguration unit of the runtime environment of the
device or the reconfiguration unit of the orchestration device
contains a prioritization attribute for the work configuration
information, which attribute indicates whether a further
work container instance to be restarted is started according
to the changed or the initial work configuration information.

11. The method as claimed in claim 1, wherein a conflict
detection is carried out on the changed work configuration
information when determining the reconfiguration require-
ment in the reconfiguration unit when second or further
diagnostic configuration information is identified.

12. The method as claimed in claim 1, wherein, when a
further work container instance of a further application for
starting in the runtime environment is received, a reconfigu-
ration requirement for the further work container instance is
determined on the basis of the diagnostic configuration
information and a conflict detection is carried out on further
work configuration information to be started.

13. The method as claimed in claim 1, wherein a recon-
figuration requirement is determined in the changed work
configuration information upon receiving a deletion request
for the diagnostic application.

14. A computer program product, comprising a non-
transitory computer readable storage medium having com-
puter readable program code stored therein, said program
code executable by a processor of a computer system to
implement the method as claimed in claim 1.

15. A system for automatically assigning changed per-
missions for diagnostic purposes for work container
instances that have already been started and provide a
container-implemented application on a device, comprising:
a device including a processor; and
a runtime environment on the device or an orchestration
device that controls provision of the application by
containers and a classification database which are con-
figured to carry out the following: in the runtime
environment or the orchestration device,
receiving configuration information for starting a con-
tainer instance,
identifying diagnostic configuration information for pro-
viding at least one diagnostic container instance of a
diagnostic application that carries out diagnostic activi-
ties with respect to at least one work container instance
of a predetermined application,
retrieving all work container instances executing the
application from the classification database,
determining a reconfiguration requirement of the
retrieved work container instances depending on the
diagnostic configuration information in a reconfigura-
tion unit,
changing initial work configuration information to pro-
vide diagnostic data according to the diagnostic con-
figuration information for each work container instance
for which a reconfiguration requirement has been deter-
mined,
in the runtime environment or in the orchestration device,
restarting changed work container instances according to
the changed initial work configuration information, and
starting the at least one diagnostic container instance of
the diagnostic application according to the diagnostic
configuration information.

* * * * *